United States Patent
Hult et al.

[11] Patent Number: 5,822,700
[45] Date of Patent: Oct. 13, 1998

[54] FLOW CONTROL OF SHORT MESSAGE SERVICE MESSAGES IN A CELLULAR TELEPHONE NETWORK

[75] Inventors: Ove Hult, Sigtuna, Sweden; Richard Brunner, Montreal, Canada

[73] Assignee: Telefonaktiebolaget L M Ericsson, Stockholm, Sweden

[21] Appl. No.: 634,376

[22] Filed: Apr. 18, 1996

[51] Int. Cl.$^6$ .................................................. H04Q 7/06
[52] U.S. Cl. ......................... 455/466; 455/458; 455/517
[58] Field of Search ................... 455/466, 38.4, 455/38.1, 515, 67.1, 453, 450, 434, 513, 509, 510, 518, 17, 7, 458, 517; 340/825.44, 825.03; 370/327, 341, 240, 389; 379/230, 133, 233

[56] References Cited

U.S. PATENT DOCUMENTS

| | | | |
|---|---|---|---|
| 4,831,373 | 5/1989 | Hess | 455/17 |
| 4,870,408 | 9/1989 | Zdunek et al. | 455/513 |
| 5,034,993 | 7/1991 | Sasuta et al. | 455/7 |
| 5,392,283 | 2/1995 | Bocci et al. | 455/466 X |
| 5,448,759 | 9/1995 | Krebs et al. | 455/517 |
| 5,477,542 | 12/1995 | Takahara et al. | 370/389 |
| 5,577,046 | 11/1996 | Diachina et al. | 370/346 X |
| 5,577,103 | 11/1996 | Foti | 455/412 |
| 5,678,179 | 10/1997 | Turcotte et al. | 455/466 X |
| 5,706,211 | 1/1998 | Beletic et al. | 455/38.1 X |

FOREIGN PATENT DOCUMENTS

| | | |
|---|---|---|
| 0 255 325 A | 2/1988 | European Pat. Off. . |
| 0 531 048 A | 3/1993 | European Pat. Off. . |
| 3843870 A1 | 6/1990 | Germany . |

*Primary Examiner*—Wellington Chin
*Assistant Examiner*—Yemane Woldetatios
*Attorney, Agent, or Firm*—Jenkens & Gilchrist

[57] ABSTRACT

Measurements of the load being carried on the control channel of a cellular telephone network air interface are made and then processed to identify a maximum permitted short message service message length for control channel transmission. Short message service messages with lengths less than the permitted maximum are authorized for transmission over the control channel. Any short message service message having a length exceeding the determined maximum length, however, is refused authorization for control channel transmission. The refused messages are either saved for control channel transmission at a later time when the measured loading permits or transmitted over the traffic channel portion of the air interface.

21 Claims, 2 Drawing Sheets

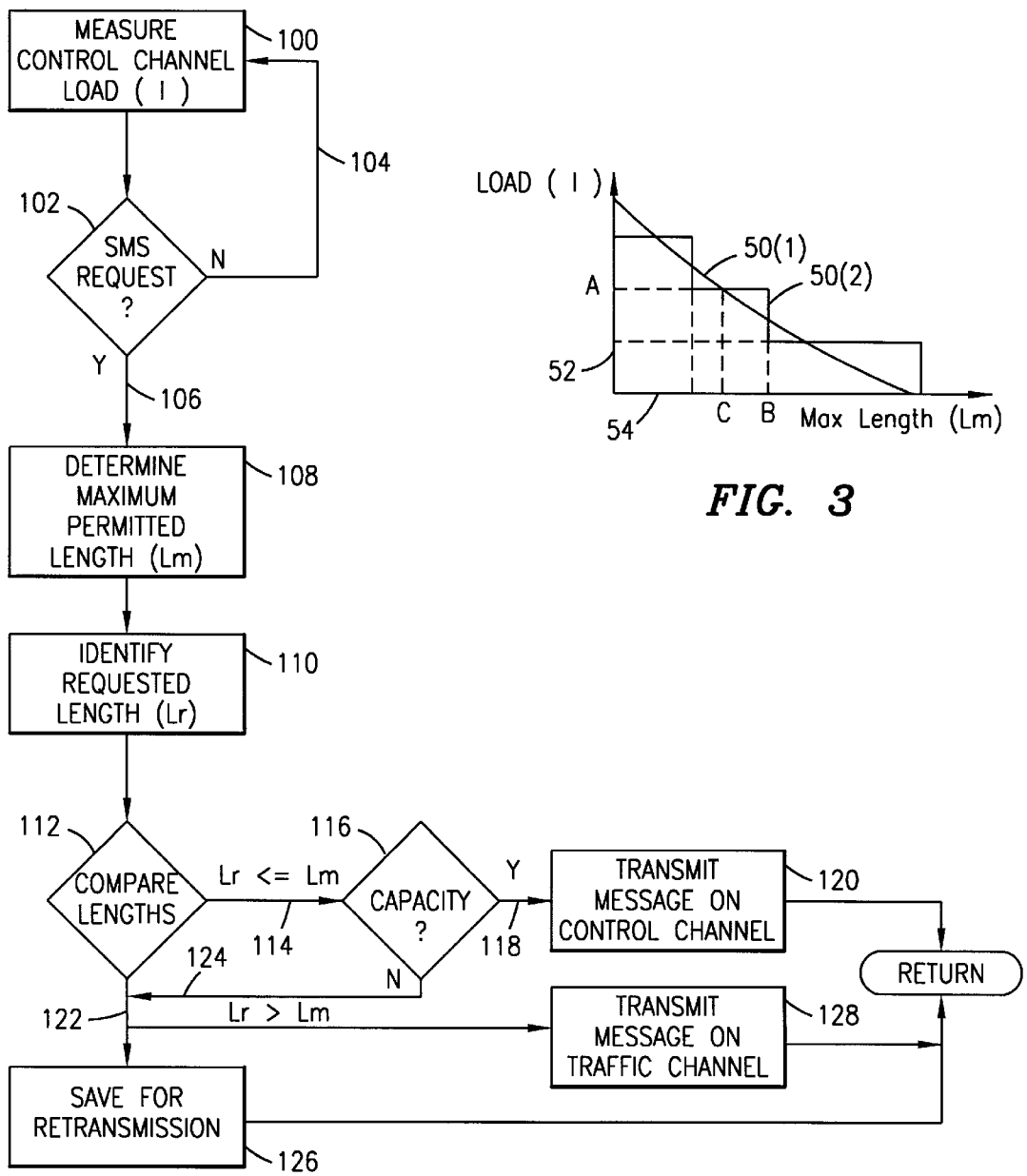
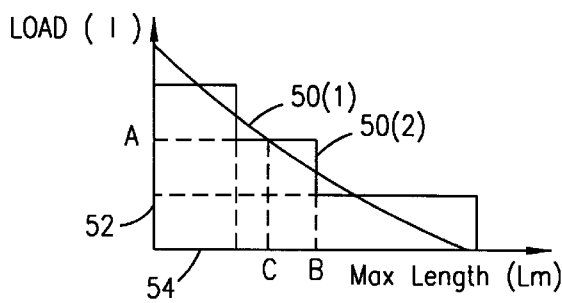
FIG. 3
FIG. 2

FLOW CONTROL OF SHORT MESSAGE SERVICE MESSAGES IN A CELLULAR TELEPHONE NETWORK

BACKGROUND OF THE INVENTION

1. Technical Field of the Invention

The present invention relates to cellular telephone networks and, in particular, to cellular telephone networks supporting short message service message delivery.

2. Description of Related Art

Many cellular telephone networks support the transmission of short message service (SMS) messages between short message entities (SMEs) including mobile stations and short message terminals. One such network comprises the digital cellular network specified in TIA IS-136. The short message service messages are typically transmitted over the control channel portion of the cellular air interface provided by the network between mobile stations and base stations. The control channel is, however, primarily provided for use in the transmission of network operation control signals, and such signals have priority over the transmission of short message service messages. Thus, approval for transmission must be requested and received before the control channel is used for the transmission of short message service messages.

Space on the control channel for the transmission of short message service messages is often time limited. Accordingly, a fixed limitation is typically placed on the length of the short message service messages transmitted over the control channel. By limiting message length, some measure of control over control channel congestion may be effectuated. In times of reduced loading on the control channel, however, the length limitation unduly restricts the efficient use of the control channel for carrying short message service messages.

It is also recognized that the traffic channel portion of the cellular air interface provided between mobile stations and base stations comprises an alternative communications resource in the network for carrying short message service messages, especially those messages which are length restricted from transmission over the control channel. However, the traffic channels are the primary revenue communications resource, and it is more profitable for the service provider to use the traffic channels to carry voice communications than short message service message data communications. Accordingly, it is preferred that short message service messages be restricted as much as possible to transmission over the control channel.

There is accordingly a need then for an improvement in the manner of handling the flow of short message service message transmissions over the cellular telephone network air interface. Such improved handling should accommodate short message service messages of varying lengths while simultaneously favoring use of the control channel as opposed to the traffic channels for the message transmission medium over the air interface.

SUMMARY OF THE INVENTION

Measurements of the communications load being handled by the control channel of a cellular telephone network air interface are made and then processed to determine a maximum length of a short message service message permitted at that time for transmission over the control channel. If a requested short message service message transmission has a length that is shorter than the determined maximum length, transmission over the control channel of the air interface is authorized. Short message service messages having a length exceeding the determined maximum length, however, are refused authorization for control channel transmission, and must either be saved for control channel transmission at a later time, or transmitted over the traffic channel portion of the air interface.

One advantage provided by this short message service message handling procedure is that there is no limitation placed on the maximum permitted length of transmitted short message service messages. Instead, any length short message service message is permitted, but transmission of any exceedingly long messages must wait for times of reduced control channel loading. Another advantage is that the procedure promotes use of the control channel rather than the traffic channels for short message service message transmissions over the air interface. Only those short message service messages having lengths that do not satisfy the control channel loading determination and analysis are refused immediate authorization for transmission over the control channel.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 is flow diagram illustrating the operation of the cellular telephone network of FIG. 1 to control the flow of short message service messages over the air interface; and FIG. 3 is a graph illustrating exemplary relationships between measured control channel loading and permitted short message service message length.

DETAILED DESCRIPTION OF THE DRAWINGS

Figure 1:
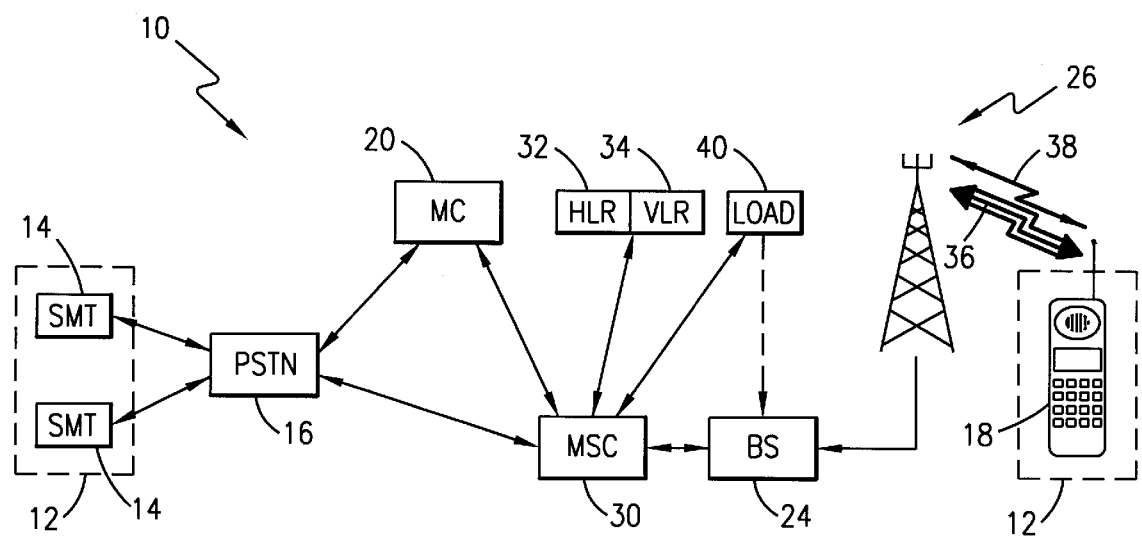
FIG. 1 is a block diagram of a cellular telephone network.

Reference is now made to FIG. 1 wherein there is shown a block diagram of a cellular telephone network 10. The network 10 supports a short message service (SMS) for use by subscribers in conjunction with their conventional voice cellular telephone service. The purpose of the short message service is to provide a means for transferring textual messages between short message entities (SMEs) 12 using the communications environment provided by the cellular telephone network 10.

The short message entities 12 participating in the short message service comprise short message terminals (SMT) 14 connected to the fixed telephone network 16 (comprising a public switched telephone network (PSTN) or other equivalent telephone network). The short message entities 12 further comprise the subscriber mobile stations (MS) 18 operating within the cellular telephone network 10. Short message service messages must originate with or terminate at one of the subscriber mobile stations 18.

A short message service center or message center (MC) 20 is connected to the fixed telephone network 16 and to the cellular telephone network 10. The message center 20 functions as a store and forward center for receiving and delivering short message service messages between the short message entities 12. In those instances where delivery of a short message service message to a short message service entity 12 fails, the message is stored in the message center 20, to be subsequently retrieved by the addressee short message entity at a later time.

The cellular telephone network 10 further includes a plurality of base stations 24 (only one shown) for effectuating radio frequency communications over an air interface 26 with the mobile stations 18. Each base station 24 is connected through a mobile switching center (MSC) 30 to the fixed telephone network 16. The mobile switching center 30 operates to control base station 24 operation, and maintain a record (in its home location register 32 and visitor location register 34) of mobile station 18 operating parameters and location within the network 10. The mobile switching center 30 further switches, with the fixed telephone network 16, those cellular telephone calls originated by or terminated at the mobile stations 18. With respect to the provision of short message services, the mobile switching center 30 is further connected to the message center 20.

While the cellular telephone network 10 is illustrated as having only one base station 24, it will, of course, be understood that such a network 10 would typically include many more base stations, and that the depiction of only one base station is to be taken as an illustration of, rather than a limitation on, the operation of the present invention. It will further be understood that cellular telephone networks like the network 10 typically include far more than a single mobile station 18 operating within the network 10 at any one time. The depiction of only one mobile station 18 then is to be taken as an illustration of, rather than a limitation on, the operation of the present invention. Finally, although only one mobile switching center 30 is shown to simplify the illustration, it will be understood that the network 10 typically will include many mobile switching centers interconnected to each other (perhaps through the fixed telephone network 16), with each mobile switching center being connected to a plurality of base stations 24.

The air interface 26 may be of either the time division multiple access (TDMA) type, code division multiple access (CDMA) type, or other type of air interface which supports the transmission of short message service messages. Short message service message transmissions with respect to a TDMA type interface, for example, are specified in TIA IS-136, and a CDMA type interface supporting short message services is specified in TIA IS-95. Such an air interface 26 typically includes a plurality of traffic channels 36 used for carrying voice communications and at least one control channel 38 used for carrying the control signals (commands) that direct operation of the system. The control signals include incoming call signals, outgoing call signals, page signals, page response signals, location registration signals, voice channel assignments, maintenance instructions, and cell selection or reselection instructions.

Short message service messages may be transmitted over the air interface 26 using either a selected one of the traffic channels 36 or the control channel 38. It is preferred, however, that as much short message service messaging traffic as possible be routed over the control channel 38 so as to not adversely impact on the availability of revenue generating communications resources for mobile station 18. The revenue generating resources comprise the plurality of traffic channels 36.

The cellular telephone network 10 further includes an air interface load measurement device 40. The device 40 is connected to the mobile switching center 30, and is operable in connection with the base stations 24 to measure the communications load carried by the air interface 26. In particular, the device 40 operates to measure the load on the control channels 38. The measured control channel load is reported back to the mobile switching center 30 and processed in a manner to be described in controlling the flow of short message service messages over the air interface 26.

Reference is now made to FIG. 2 wherein there is shown a flow diagram illustrating the operation of the cellular telephone network 10 to control the flow of short message service messages over the air interface 26. In step 100, the network 10 measures the load (l) on the control channel 38 of the air interface 26. A determination is then made in step 102 as to whether a request for a short message service message transmission over the air interface 26 has been made. If no request has been made, the process returns via loop 104 to again make a control channel loading measurement. If, instead, a request had been made for short message service message transmission (branch 106), the loading measurement is processed in step 108 to determine a maximum length ($L_m$) permitted at that time for a short message service message transmission over the control channel 38.

Reference is now made to FIG. 3 wherein there is shown a graph illustrating an exemplary relationship 50 between measured control channel load (l) on the y-axis 52 and the maximum permitted short message service message length ($L_m$) on the x-axis 54. The relationship 50 is used in making the processing determination of step 108. In general, it will be noticed that the relationship is substantially inversely proportional in nature, wherein the greater the measured control channel load (l), the shorter the maximum permitted short message service message length ($L_m$). The relationship 50 may comprise a continuous (or piecewise linear) relationship 50(1) wherein each point of measured control channel load (l) is associated with a single maximum permitted short message service message length ($L_m$). Alternatively, the relationship 50 may comprise a stair-step relationship 50(2) wherein a range of measured control channel loads (l) are associated with a single maximum permitted short message service message length ($L_m$). It will, of course, be understood that other types of relationships 50 may be specified for use in making the step 108 determination, and that the relationships 50(1) and 50(2) of FIG. 3 are illustrative, rather than restrictive, of system operation.

Referring now again to FIG. 2, following the determination in step 108 of maximum permitted short message service message length ($L_m$), the received request for a short message service message transmission over the air interface 26 is processed in step 110 to identify a length ($L_r$) of the short message service message requested for transmission. The requested short message service message length ($L_r$) is then compared to the maximum permitted short message service message length ($L_m$) in decision step 112 to determine whether the requested length exceeds the maximum length. If the short message service messages has a requested length ($L_r$) that does not exceed the determined maximum length ($L_m$), branch 114, a test is then made in decision step 116 to determine if the control channel 38 of the air interface 26 has sufficient capacity. If sufficient capacity exists, branch 118, the short message service message is authorized for transmission over the control channel 38 of the air interface 26 and is transmitted in step 120. If the short message service message has a requested length ($L_r$) that exceeds the determined maximum length ($L_m$), branch 122, or when there is insufficient capacity on the control channel 38, branch 124, authorization for transmission over the control channel 38 of the air interface 26 is refused. These short message service messages must then either be saved in step 126 for subsequent transmission over the control channel 38 (at a point when the measured control channel load (l) sufficiently decreases and/or capacity becomes available) or are alternatively transmitted over the traffic channel 36 portion of the air interface 26 in step 128.

Referring now to FIGS. 1–3, operation of the present invention in exercising flow control over short message service message transmissions may be better understood through the examination of some specific examples. Consider first a short message service message intended for delivery to a mobile station 18. A short message service delivery point-to-point (SMSDPP) invoke communication is generated at the message center 20 and routed (in accordance with the information stored in the home location register 32 and visitor location register 34) through the cellular network until it reaches the mobile switching center 30 serving the base station 24 for the cell where the addressee mobile station 18 is currently located. At that point in time, a request is made of the network 10 to transmit the short message service message over the air interface 26 to the addressee mobile station 18 (step 102), the message having a certain identified length ($L_r$) (step 110). In the meantime, measurements have continuously and/or periodically been made of the load (l) on the control channel 38 for the air interface 26 used by the base station 24 to communicate with the addressee mobile station (step 100). Responsive to the request for short message service message transmission, a determination is made by the network 10 of the maximum permitted short message service message length ($L_m$) for transmission over the control channel 38 (step 108). For example, with specific reference to FIG. 3, if the measured load (l) is "A", then the maximum permitted short message service message length ($L_m$) is "B" with respect to the relationship 50(2), and "C" with respect to the relationship 50(1). The maximum permitted short message service message length ($L_m$) is then compared to the length ($L_r$) of the requested short message service message (step 112).

If the length ($L_r$) of the requested short message service message is less than or equal to the maximum permitted short message service message length ($L_m$) (branch 114), and capacity on the control channel 38 is available (branch 118), then the message is authorized and transmitted to the mobile station 18 over the control channel 38 of the air interface 26 (step 120). If, on the other hand, the length ($L_r$) of the requested short message service message is greater than the maximum permitted short message service message length ($L_m$) (branch 122), or insufficient capacity exists (branch 124), then the message is not authorized and cannot at that time be transmitted to the mobile station 18 over the control channel 38 of the air interface 26. At this point, the message is returned to the message center 20 for storage and subsequent transmission to the mobile station 18 when the measured load (l) on the control channel 38 of the air interface 26 permits that length transmission (step 126). Alternatively, the message is transmitted to the mobile station 18 over one of the traffic channels 36 of the air interface 26 (step 128).

Consider next a short message service message originated at the mobile station 18 and intended for delivery to another mobile station in the network 10 or to a short message terminal 14. The mobile station initiates a communication over the control channel 38 of the air interface 26 requesting network 10 authorization to make a short message service message transmission (step 102). This request includes information concerning the length ($L_r$) of the requested short message service message (step 110). In the meantime, measurements have continuously and/or periodically been made of the load (l) on the control channel 38 for the air interface 26 used by the base station 24 to communicate with the addressee mobile station (step 100).

Responsive to the request for short message service message transmission, a determination is made by the network 10 of the maximum permitted short message service message length ($L_m$) for transmission over the control channel 38 (step 108). For example, with specific reference to FIG. 3, if the measured load (l) is "A", then the maximum permitted short message service message length ($L_m$) is "B" with respect to the relationship 50(2), and "C" with respect to the relationship 50(1). The maximum permitted short message service message length ($L_m$) is then compared to the length ($L_r$) of the requested short message service message (step 112).

If the length ($L_r$) of the requested mobile originated short message service message is less than or equal to the maximum permitted short message service message length ($L_m$) (branch 114), and capacity on the control channel 38 is available (branch 118), then the message is authorized for transmission by the network. The mobile station 18 then generates a short message service origination communication that is transmitted over the control channel 38 of the air interface 26 (step 120). If, on the other hand, the length ($L_r$) of the requested mobile originated short message service message is greater than the maximum permitted short message service message length ($L_m$) (branch 122), or insufficient capacity exists (branch 124), then the message is not authorized for transmission by the mobile station 18 at that time. One option at this point is to have the mobile station 18 save the message for subsequent transmission when the measured load (l) on the control channel 38 of the air interface 26 permits that length transmission (step 126). Alternatively, the message is transmitted from the mobile station 18 over one of the traffic channels 36 of the air interface 26 (step 128).

When the message transmission is not authorized (branches 122 and 124), the determination of whether to save the message for retransmission (step 126) or transmit over the traffic channels (step 128) is made in view of previously specified network 10 service provider operation instructions (i.e., a stored network service or resource profile). These operation instructions may specify that all short message service messages are to be transmitted over the control channel 38 of the air interface 26. In such a case, the message is always saved for retransmission (step 126). In connection with the transmission over the traffic channels (step 128), on the other hand, the operation instructions may specify a certain percentage use of the traffic channels for short message service message transmission, or a length restriction for short message service message transmission over the control channel.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for controlling the flow of short message service messages over an air interface comprising the steps of:

measuring communications load on a control channel of the air interface;

determining a maximum permitted length for a short message service message based on the measured control channel load;

responsive to a request for short message service transmission, identifying a length for the requested short message service message transmission;

comparing the identified length to the determined maximum permitted length; and refusing the requested short message service message transmission if the identified length exceeds the determined maximum permitted length.

2. The method as in claim 1 further including the step of repeating the steps of measuring and determining until the request for short message service transmission is received.

3. The method as in claim 1 further including the step of transmitting the requested short message service message over the control channel if the identified length does not exceed the determined maximum permitted length.

4. The method as in claim 1 further including the step of transmitting the requested short message service message over a traffic channel of the air interface if the identified length exceeds the determined maximum permitted length.

5. The method as in claim 1 further including the step of saving the requested short message service message for subsequent transmission over the control channel if the identified length exceeds the determined maximum permitted length.

6. The method as in claim 5 further including the step of transmitting the saved requested short message service message over the control channel when the identified length is subsequently found not to exceed the determined maximum permitted length.

7. The method as in claim 1 wherein the step of determining selects the maximum permitted length with substantially an inverse proportionality to the measured control channel load.

8. The method as in claim 1 further including the steps of:

determining whether sufficient capacity exists on the air interface to carry the short message service message; and refusing the requested short message service message transmission if sufficient capacity does not exist.

9. A system for controlling the flow of short message service messages over an air interface of a cellular telephone network, comprising:

means for measuring communications load on a control channel of the air interface; and processing means responsive to the measured communications load for permitting transmission of a requested short message service message over the control channel if a length of the requested short message service message does not exceed a maximum permitted message length derived from the measured control channel load.

10. The system of claim 9 wherein the processing means further permits transmission of the requested short message service message over a traffic channel of the air interface if the length of the requested short message service message exceeds the maximum permitted message length derived from the measured control channel load.

11. The system of claim 9 wherein the processing means further saves the requested short message service message for subsequent transmission over the control channel if the length of the requested short message service message exceeds the maximum permitted message length derived from the measured control channel load.

12. The system of claim 9 wherein the derived maximum permitted length and the measured control channel load have a substantially inversely proportional relationship.

13. A system for controlling the flow of short message service messages over an air interface of a cellular telephone network, comprising:

means for measuring communications load on a control channel of the air interface; and processing means responsive to the measured communications load for refusing transmission of a requested short message service message over the control channel if a length of the requested short message service message exceeds a maximum permitted message length derived from the measured control channel load.

14. The system of claim 13 wherein the processing means permits transmission of the requested short message service message over a traffic channel of the air interface if the requested short message service message is refused transmission over the control channel.

15. The system of claim 13 wherein the processing means saves the requested short message service message for subsequent transmission over the control channel if the requested short message service message is refused transmission over the control channel.

16. The system of claim 13 wherein the derived maximum permitted length and the measured control channel load have a substantially inversely proportional relationship.

17. A method for controlling the flow of short message service messages over an air interface comprising the steps of:

measuring communications load on a control channel of the air interface;

determining a maximum permitted length for a short message service message based on the measured control channel load;

responsive to a request for short message service transmission, comparing an identified length for the requested short message service message transmission to the determined maximum permitted length; and permitting the requested short message service message transmission if the identified length does not exceed the determined maximum permitted length.

18. The method as in claim 17 further including the step of repeating the steps of measuring and determining until the request for short message service transmission is received.

19. The method as in claim 17 further including the step of permitting transmission of the requested short message service message over a traffic channel of the air interface if the identified length exceeds the determined maximum permitted length.

20. The method as in claim 17 further including the step of saving the requested short message service message for subsequent transmission over the control channel if the identified length exceeds the determined maximum permitted length.

21. The method as in claim 17 wherein the maximum permitted length and measured control channel load have a substantially inversely proportional relationship.

* * * * *